(12) United States Patent
Mizrahi (10) Patent No.: US 6,348,984 B1
(45) Date of Patent: Feb. 19, 2002

(54) OPTICAL ADD/DROP MULTIPLEXER

(75) Inventor: Victor Mizrahi, Columbia, MD (US)

(73) Assignee: Ciena Corporation, Linthicum, MA (US)

( * ) Notice: Subject to any disclaimer, the term of this patent is extended or adjusted under 35 U.S.C. 154(b) by 0 days.

(21) Appl. No.: 09/187,122

(22) Filed: Nov. 5, 1998

(51) Int. Cl.⁷ .............................................. H04J 14/02
(52) U.S. Cl. .......................... 359/124; 359/130; 385/37
(58) Field of Search ................................ 359/130, 127, 359/124; 385/24, 37

(56) References Cited

U.S. PATENT DOCUMENTS

| | | | | |
|---|---|---|---|---|
| 5,504,609 A | * | 4/1996 | Alexander et al. | 359/125 |
| 5,748,349 A | * | 5/1998 | Mizrahi | 359/130 |
| 5,778,118 A | * | 7/1998 | Sridhar | 385/24 |
| 5,982,518 A | * | 11/1999 | Mizrahi | 359/130 |
| 6,069,719 A | * | 5/2000 | Mizrahi | 359/130 X |

OTHER PUBLICATIONS

Yan Sun, et al., "An 80nm Ultra Wide Band EDFA with Low Noise Figure and High Output Power", ECOC 97, Sep. 22–25 1997, Conference Publication No. 448, pp. 69–72.

Jones et al., "Optical Wavelength Add–drop Multiplexer in Installed Submarine WDM Network", *Electronics Letters*, vol. 31, No. 24, pp. 2117–2118, Sep. 1995.*

Chawki et al., "Optical Boosted Add/Drop Multiplexer Including Circulators and Fiber Grating Filters", European Conference on Optical Comm., pp. 47–50, 1995.*

* cited by examiner

*Primary Examiner*—Thomas Mullen
(74) *Attorney, Agent, or Firm*—David L. Soltz; Daniel N. Daisak (57) ABSTRACT

In accordance with the present invention, an optical device includes a bandsplitter for separating a wavelength division multiplexed signal into a first and second group of channels. Transmission of one or more channels within the first group of channels is suppressed by one or more filtering elements positioned within a transmission path. The one or more suppressed channels correspond to channels to be added to the wavelength division multiplexed signal. By splitting the multiplexed optical signal into separate wavelength bands, channels previously designated as add/drop channels and their associated components, do not have to be altered with the introduction of additional channels into a WDM or DWDM network. An add/drop module optically communicates with the bandsplitter to add/drop one or more of the channels included in the multiplexed optical signal.

31 Claims, 8 Drawing Sheets

OPTICAL ADD/DROP MULTIPLEXER

FIELD OF INVENTION

The present invention relates generally to optical communication systems and more particularly to a system and apparatus for adding/dropping optical channels within a communications network.

BACKGROUND OF INVENTION

Wavelength Division Multiplexing (WDM) is used to transmit a plurality of optical channels via an optical waveguide medium where each channel carries information signals within a network or system. Each channel within the multiplexed signal is associated with a particular wavelength, thereby increasing the information capacity of fiber optic systems. Such optical systems include, for example, local area networks (LANs), telecommunication systems and cable television systems.

In WDM and dense WDM (DWDM) systems, it is beneficial to select a particular wavelength from the group of wavelengths comprising the multiplexed optical signal. This is advantageous in order to drop and add the same or different channel wavelengths at various points within an optical network. Optical add-drop multiplexers are employed in telecommunications networks in order to add/drop one or more of these channels. When fiber Bragg gratings are used as the principal drop filtering elements in add-drop multiplexers, the drop channels are restricted to the shortest wavelengths within the channel plan to avoid radiation and/or cladding mode loss on the short wavelength side of the gratings. A more detailed explanation of the use of fiber Bragg gratings in optical add-drop multiplexers as well as the impact of radiation mode loss on the selection of add/drop channels can be found in U.S. Pat. Nos. 5,748,349 and 5,982,518 assigned to the assignee of the present invention and incorporated herein by reference.

Figure 1:
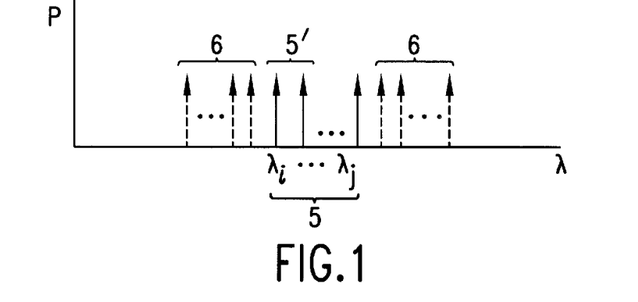
FIG. 1 schematically illustrates an exemplary channel plan employed in an optical communication system.

With the advent of increasing channel counts in WDM networks, expandable systems have been introduced (e.g. see U.S. Pat. No. 5,504,609 assigned to the assignee of the present invention) where additional channels may be added to accommodate increasing bandwidth demands on existing networks. FIG. 1 schematically illustrates a channel plan for wavelengths within an optical communication system. A first group of channels 5 having wavelengths $\lambda_i \ldots \lambda_j$ can comprise, for example, 8, 16, 32, 40 or even more wavelengths in the 1.5 $\mu$m range. With increasing channel counts, channel spacings decrease from about 200 GHz or more down to approximately 25 GHz or less. A first channel subset, on the short side of channel group 5, denoted as group 5', is typically designated as the add/drop channels within the channel plan to avoid the radiation mode loss problem referenced above. The designated add/drop channels have associated with them particular transmission and filtering components within the WDM network tuned to transmit, and add/drop these particular channels. When bandwidth requirements necessitate additional channels to be added to the channel plan, it is advantageous not to add these channels so as to affect the drop channels and their associated components. For example, a second group of channels 6 (e.g. 8, 16, 32, 40, etc. additional wavelengths) can be added on the short side of channel group 5, on the high side of channel group 5, or a combination thereof. If channel group 6 or a portion thereof is added to the short side of channel group 5, channel group 5' designated as the add/drop channels are no longer on the short wavelength side of the channel plan and therefore affect the radiation mode loss problem associated with the filtering elements. Moreover, particular components within the network are still configured to add/drop the channels within group 5'. Accordingly, to change these components would be costly and disadvantageous to the modular features associated with optical transmission systems. Additionally, when Bragg gratings are used, signal attenuation problems associated with radiation mode loss of the gratings can affect the through channels.

Thus, there is a need for an optical device which allows add/drop channel configurations to be maintained with existing network components while accommodating the addition of more channels to expand transmission capabilities. There is a further need for an optical add/drop multiplexer which separates a multiplexed optical signal into separate channel bands to accommodate add/drop channel selection.

SUMMARY OF INVENTION

The invention meets these needs and avoids the above-referenced drawbacks by providing an optical device for use in a wavelength division multiplexed optical communication system. A wavelength division multiplexed optical signal having a plurality of optical channels is supplied to an optical bandsplitter. The bandsplitter is configured to separate the plurality of optical channels into a first group of channels and a second group of channels. A first transmission path optically communicates with the bandsplitter and carries the optical channels associated with the first group of channels. One or more filtering elements positioned along the first transmission path suppresses transmission of a first set of channels within the first channel group corresponding to optical channels to be added to the multiplexed optical signal. The filtering elements are configured to transmit through channels corresponding to channels within the first group of channel which fall of the first set of optical channels. A second transmission path optically communicating with the bandsplitter carries optical channels associated with the second group of channels. An optical combiner optically communicates with the first and second transmission paths. The combining element is configured to output the through channels and the channels within the second group of channels.

DETAILED DESCRIPTION

In accordance with the present invention, an add/drop multiplexer receives a WDM communication signal having a multiplexed optical signal having a plurality of optical channels, each channel at a respective wavelength. A bandsplitting element separates the received multiplexed optical signal into at least a first group of channels and a second group of channels. The first group of channels propagates along a transmission path where either one or more filtering elements and/or an add/drop module is disposed where one or more channels associated with the first group of channels can be routed from the multiplexed optical signal. The channels not so routed are transmitted through the filtering elements and/or the add/drop module to an optical combiner where the through channels, the channels associated with the second group as well as channels to be added to the multiplexed signal are combined. By separating the multiplexed optical signal into separate groups of channels, channels previously designated as add/drop channels and their associated components, do not have to be altered with the introduction of additional optical channels into a WDM or DWDM network. Moreover, one or more of the channels within one or more of the respective channel groups may be added/dropped by an add/drop module which optically communicates with the bandsplitter.

Figure 2:
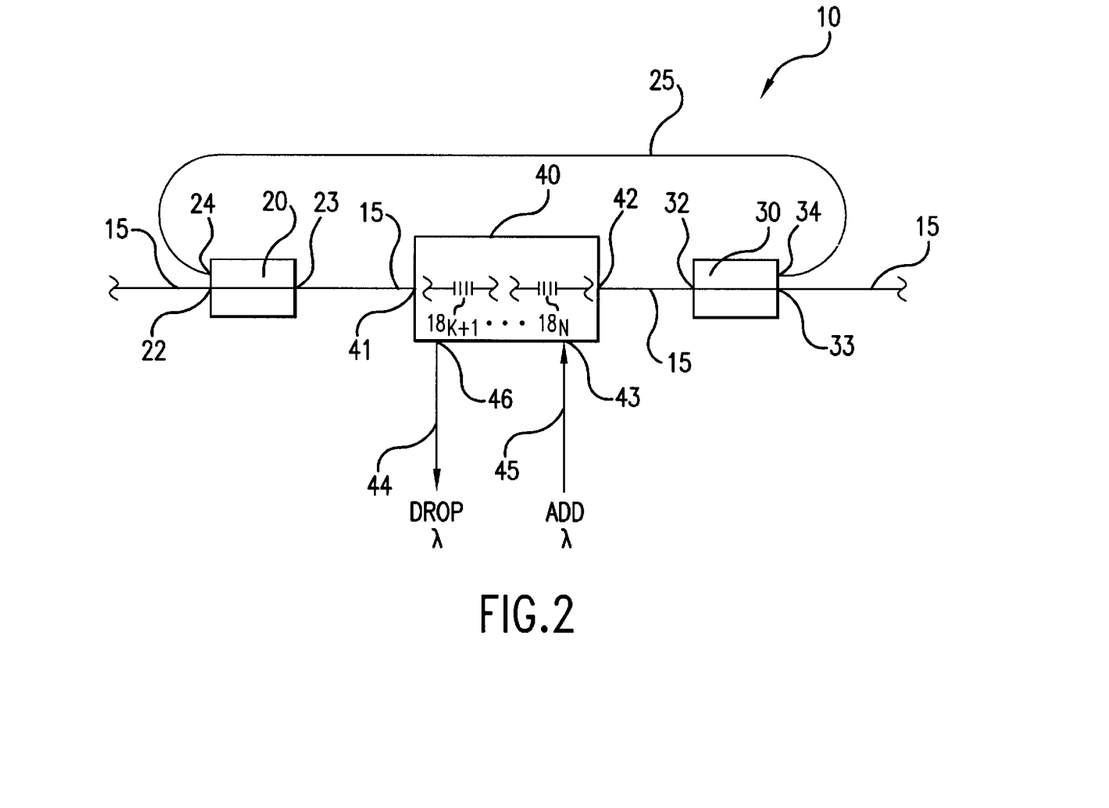
FIG. 2 illustrates a simplified schematic view of an optical device in accordance with the present invention.

Turning to the drawings in which like reference characters indicate the same or similar elements, FIG. 2 illustrates a simplified view of a first embodiment in accordance with the present invention in which an optical device 10 comprises a bandsplitting element 20, a band-combining element 30 and add/drop module 40. A transmission path 15 is coupled to a first port 22 of bandsplitting element 20 and carries a multiplexed optical signal having a plurality of optical channels, each at a respective wavelength $\lambda_1 \ldots \lambda_N$. The transmission paths referenced herein, for example path 15, can be a single mode optical fiber (e.g. SMF-28) having a transmission window in the 1.5 $\mu$m range, however any optical waveguide which is capable of transporting the desired optical signals can be employed.

Bandsplitting element 20 is configured to reflect a first group or band of channels within the multiplexed optical signal and transmit a second group or band of channels within the multiplexed signal effectively forming separate channel bands. Bandsplitting element 20 reflects the first channel group onto transmission path 25 via port 24 and transmits the second channel group onto transmission path 15 via port 23. Bandsplitting element 20 can include, for example, a three port interference filter configured to transmit one or more channels associated with a range of wavelengths or bandwidth and reflect channels falling outside of the filter bandwidth. Such exemplary interference filters are commercially available from, for example, JDS Fitel Inc.

Figure 3:
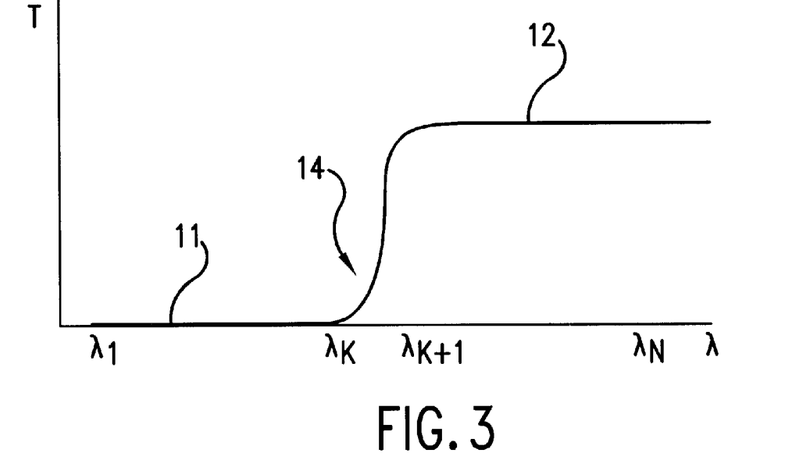
FIG. 3 illustrates an idealized transmission spectrum representative of a first and second group of channels in accordance with the present invention.

FIG. 3 illustrates an exemplary idealized transmission spectrum of a first band of channels 11 within the multiplexed optical signal having wavelengths $\lambda_1 \ldots \lambda_K$ and a second band of channels 12 having wavelengths $\lambda_{K+1} \ldots \lambda_N$.

In this illustration, the first band of channels 11 comprises short wavelengths relative to the second channel band 12 which comprises longer wavelengths. By way of example, the first band of channels having wavelengths $\lambda_1 \ldots \lambda_K$ can correspond to channels 1 through 40 in an 80 channel DWDM communications system and the second band of channels having wavelengths $\lambda_{K+1} \ldots \lambda_N$ can correspond to channels 41 through 80. Optical bandsplitting element 20 can be configured to have a high transmissivity characteristic for channels within band 12 and a low transmissivity or reflection characteristic for channels within band 11. Alternatively, bandsplitting element 20 can also be configured to transmit the first band of channels and reflect the second band of channels. Bandsplitting element 20 can also include a "guardband" area 14 where bandsplitting element 20 crosses over from reflection of optical channels in band 11 to transmission of channels in band 12. If an interference filter is included in bandsplitting element 20, this guardband area can be, for example, approximately 3 nm or less which may, for example, correspond to approximately a three channel bandwidth for 100 GHz spaced channels.

Returning to FIG. 2, an optical add/drop module 40 optically communicates with bandsplitting element 20 and band-combining element 30 along transmission path 15. As used herein, "optically communicates" refers to any connection, coupling, link or the like by which optical signals carried by an optical system element are imparted to another optical system element. Such optically communicating devices are not necessarily directly connected to one another, but may be separated by intermediate optical components or devices. Add/drop module 40 receives the second band of channels included in the multiplexed optical signal transmitted by bandsplitting element 20 via port 41. Add/drop module 40 is configured to drop one or more channels within the second band of channels. The dropped channels exit port 46 onto transmission path 44. The channels to be added enter module 40 via port 43 and transmission path 45. Optical channels, either the same as or different from the dropped channels, may be added to the multiplexed signal via add/drop module 40.

Add/drop module 40 can have various configurations capable of adding and dropping one or more particular optical channels from a multiplexed optical signal. Exemplary add-drop multiplexers are described in commonly assigned U.S. Pat. No. 6,069,719 and commonly assigned U.S. Pat. Nos. 5,748,349 and 5,778,118, the disclosures of which are incorporated by reference herein. The principal selection filters within exemplary add/drop module 40 can be fiber Bragg gratings $18_{K+1} \ldots 18_N$ used to add/drop one or more channels within the second band of channels received via bandsplitting element 20. The add/drop channels are typically associated with the short side of the channel band due to radiation mode loss associated with the gratings as described herein. Each grating $18_{K+1} \ldots 18_N$ can have an associated wavelength band of low transmissivity corresponding to one or more channels having corresponding wavelengths $\lambda_{K+1} \ldots \lambda_N$ within the multiplexed signal.

Figure 4:
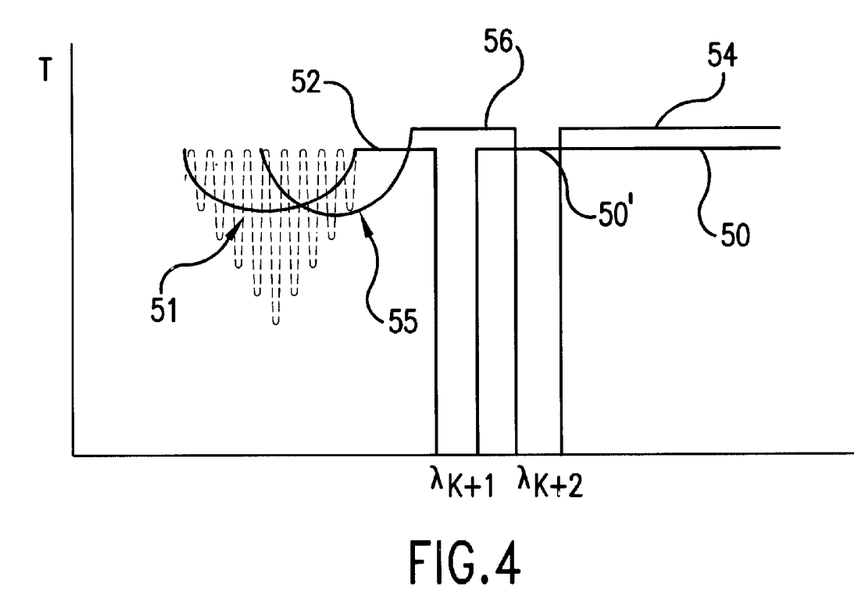
FIG. 4 is a schematic representation of the transmission spectra associated with two exemplary fiber gratings in accordance with the present invention.

Typically, Bragg gratings comprise a series of photoinduced refractive index perturbations in an optical fiber which suppress transmission of optical signals within a selected wavelength band and transmit wavelengths outside of the selected wavelength band. Strong gratings, those that suppress transmission of over 95% of the incident wavelengths, generally include a significant radiation mode loss band on the short wavelength side of the transmission/reflection spectrum. FIG. 4 is a schematic representation of the transmission spectra associated with two exemplary gratings $18_{K+1}$ and $18_{K+2}$ which reflect channels having wavelengths $\lambda_{K+1}$ and $\lambda_{K+2}$, respectively. These channels can correspond to the shortest wavelengths within the wavelength band separated and transmitted by bandsplitting element 20 and supplied to transmission path 15 via port 23. Typical frequency spacings between these channels in high channel count systems can be within the range of 25–100 GHz.

Transmission spectrum 50 is associated with exemplary grating $18_{K+1}$ and includes a radiation mode loss region 51 and a "gap" region 52 of high transmissivity on the short side of the reflected channel having wavelength $\lambda_{K+1}$. Similarly, transmission spectrum 54 is associated with exemplary grating $18_{K+2}$ and includes a radiation mode loss region 55 and a gap region 56 of high transmissivity on the short side of the reflected channel having wavelength $\lambda_{K+2}$. Radiation mode loss describes any optical signal loss due to scattering out of the core of the waveguide, including radiation scattered into the cladding of the waveguide. As gratings become stronger, i.e. reflect more of the incident light, radiative scattering increases thereby enlarging the radiation mode loss regions, e.g. regions 51 and 55, while high transmissivity regions, e.g. regions 52 and 56, become shorter. Although FIG. 4 illustrates effective portions of the spectra associated with radiation mode loss regions 51, 55, a more accurate illustration of region 51, for example, is illustrated by transmission characteristic portion 51' shown in phantom which represents an example of varying loss associated with wavelength. Because of radiation mode loss associated with Bragg gratings, it is desirable to ensure that the channels transmitted by a particular grating do not fall within the radiation mode loss region of the grating, thereby avoiding signal attenuation. A more detailed discussion of radiation mode loss as well as techniques for reducing these regions in gratings is discussed in Mizrahi and Sipe, *Journal of Lightwave Tech.*, Vol. 11, pp. 1513–1517 (October 1993) incorporated herein by reference.

One way to quantify this signal attenuation effect is by defining "loss tilt" associated with an optical transfer element. Assuming an ideal set of WDM optical signals all of equal power, the loss tilt may be defined as being equal to the change in the maximun power imbalance between a pair of channels transmitted through the transfer element. This definition can be applied to one or more gratings and/or associated optical components.

The channel having wavelength $\lambda_{K+1}$ is reflected by grating $18_{K+1}$ and the channel having wavelength $\lambda_{K+2}$ passes through grating $18_{K+1}$ within portion 50' of transmission spectrum 50 until it is reflected by grating $18_{K+2}$. Similar transmission spectra are associated with subsequent channels having wavelengths $\lambda_{K+3} \ldots \lambda_N$ to be reflected by gratings within add/drop module 40. The optical channels within the second band which are not dropped by add/drop module 40 are transmitted through module 40. These transmitted channels are referred to as "through" channels. The through channels as well as the channels added via port 43, exit module 40 by way of port 42. As described above, radiation mode loss associated with optical add/drop multiplexers utilizing Bragg gratings limits the number of these through channels due to signal attenuation associated with channels falling within the loss region. This effects the loss tilt of the through channels as they pass through the plurality of gratings included in exemplary add/drop module 40.

Because of radiation mode loss, the number of channels "M" that may be added/dropped by a gratings based add/drop multiplexer is approximately equal to N+Q where Q represents the channel(s) to which the grating is tuned and N is the number of channels, based on a channel spacing of X, which fit within a gap region (e.g. region 52) having width Y or N=Y/X. Thus, the number of channels, spaced 100 GHz apart, that will fit in this gap region will be less than the number of channels, spaced 50 GHz apart, that will fit in the same gap region. However, by separating a multiplexed optical signal into groups of channels where channels within each group can be added/dropped, signal attenuation problems associated with radiation mode loss of Bragg gratings is avoided. In other words, the loss tilt over the transmitted channels is less than the loss tilt over the channels if they were transmitted through each grating in sequence.

The through channels are supplied to port 32 of band-combining element 30 which optically communicates with add/drop module 40 and bandsplitting element 20. The first band of channels enters band-combining element 30 via port 34 where they are combined with the through channels and the add channels received from add/drop module 40. Band-combining element 30 can be, for example, an optical combiner, an interference filter or other optical device configured to combine one or more optical channels.

In this manner, when additional channels are added to existing optical networks, existing components configured to add/drop particular channels do not need to be modified/changed, thereby avoiding costly alterations.

Figure 5:
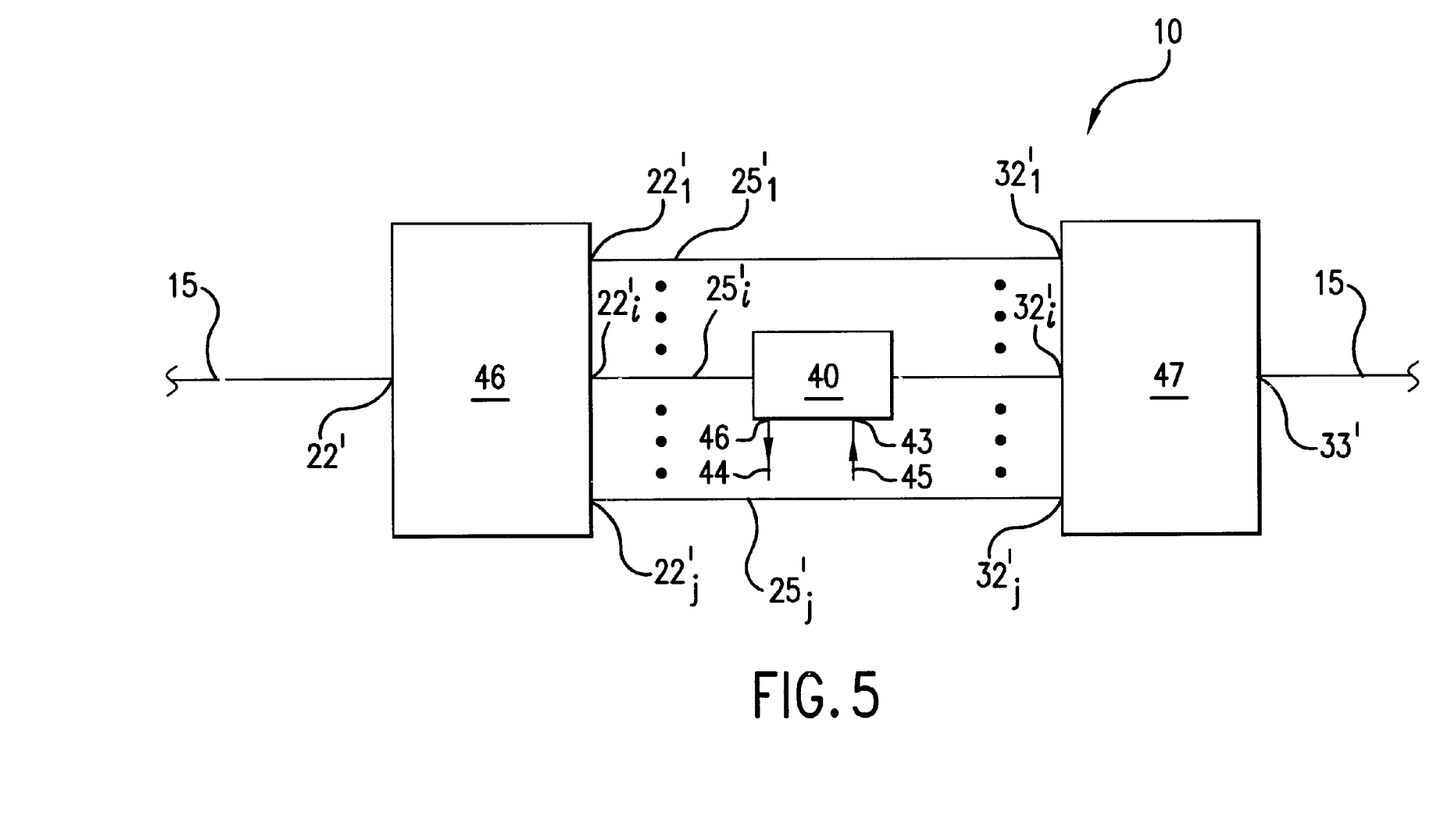
FIG. 5 schematically illustrates an alternative embodiment of an optical device in accordance with the present invention.

FIG. 5 illustrates an alternative embodiment of optical device 10 where bandsplitting element 46 is configured to split a multiplexed optical signal into a plurality of j separate channel bands where each band may include one or more channels. The multiplexed signal is supplied by transmission path 15 and is received by bandsplitting element 46 via port 22'. Bandsplitting element 46 is configured to separate the received multiplexed optical signal into a plurality of channel bands and supplies each band to transmission paths $25_1' \ldots 25_j'$ via ports $22_1' \ldots 22_j'$, respectively. Bandsplitting element can be, for example, a plurality of interference filters configured to transmit one or more channels falling within a particular channel bandwidth and reflect channels falling outside of the particular channel bandwidth. An exemplary bandsplitting element 46 using a plurality of interference filters is described with reference to FIG. 6 below.

One or more add/drop modules, for example add/drop module 40, can be positioned along one or more transmission paths $25_1' \ldots 25_j'$ and optically communicates with bandsplitting element 46 and band-combining element 47 via ports $22_1' \ldots 22_j'$ and $32_1' \ldots 32_j'$, respectively. For example, add/drop module 40 can be positioned along transmission path $25_i'$ for adding and dropping optical channels lying within channel band "i" where $1 \leq i \leq j$. Add/drop module 40 selects one or more channels within the channel band to be dropped and supplies them to transmission path 44 via drop port 46. One or more channels to be added to channel band "i" is supplied to port 43 via transmission path 45.

Band-combining element 47 receives the j channel bands via ports $32_1' \ldots 32_j'$ and is configured to combine these channel bands as well as the channels added by way of add/drop module 40 included in the channel bands. Band-combining element supplies the combined optical channels to transmission path 15 via port 33'. Band-combining element can be, for example, a plurality of interference filters, however any other optical device which is capable of combining multiple channel bands where each band includes one or more channels can be employed as band-combining element 47.

Figure 6:
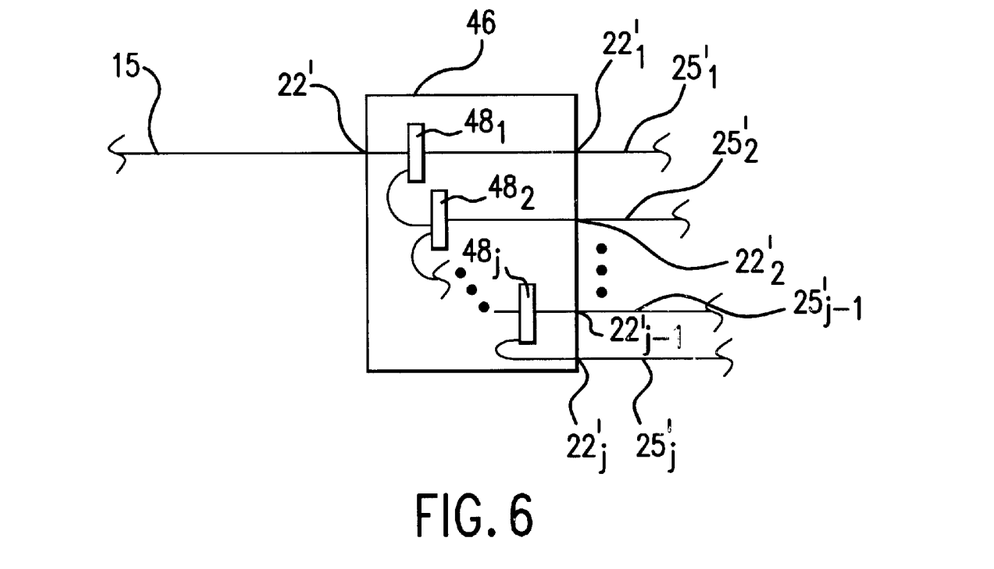
FIG. 6 schematically illustrates an exemplary bandsplitter illustrated in FIG. 5.

FIG. 6 schematically illustrates an exemplary embodiment of bandsplitting element 46 including a plurality of interference filters $48_1, 48_2 \ldots 48_j$ optically communicating to split the multiplexed optical signal into j channel bands. Although bandsplitting element 46 is described herein as including a plurality of interference filters, any other optical device which is capable of separating a multiplexed optical signal into a plurality of channel bands can be employed. Filtering elements $48_1, 48_2 \ldots 48_j$ are configured to transmit one or more optical channels within a particular channel band and reflect optical channels which fall outside of the particular channel band. When interference filters are used as filtering elements $48_1, 48_2 \ldots 48_j$, the channel bands may be separated by a guardband as described above.

The multiplexed optical signal is received by filtering element $48_1$ which transmits a first band of channels from the multiplexed signal onto transmission path $25'_1$ via port $22'_1$ and reflects optical channels lying outside of the first channel band to filtering element $48_2$. Filtering element $48_2$ receives the channels reflected by element $48_1$, transmits a second band of channels to transmission path $25'_2$ via port $22'_2$ and reflects channels to the next filtering element. This configuration continues until filtering element $48_j$ transmits the "j-1" band of channels onto transmission path $25'_{j-1}$ via port $22'_{j-1}$, and reflects the remaining channel band onto transmission path $25'_j$ via port $22'_j$. Although filtering elements $48_1, 48_2 \ldots 48_j$ are described above as transmitting a particular group of channels comprising a channel band and reflecting channels lying outside of a channel band, it should be understood that the filtering elements can be configured to reflect a particular channel band and transmit the remaining channels.

Figure 7:
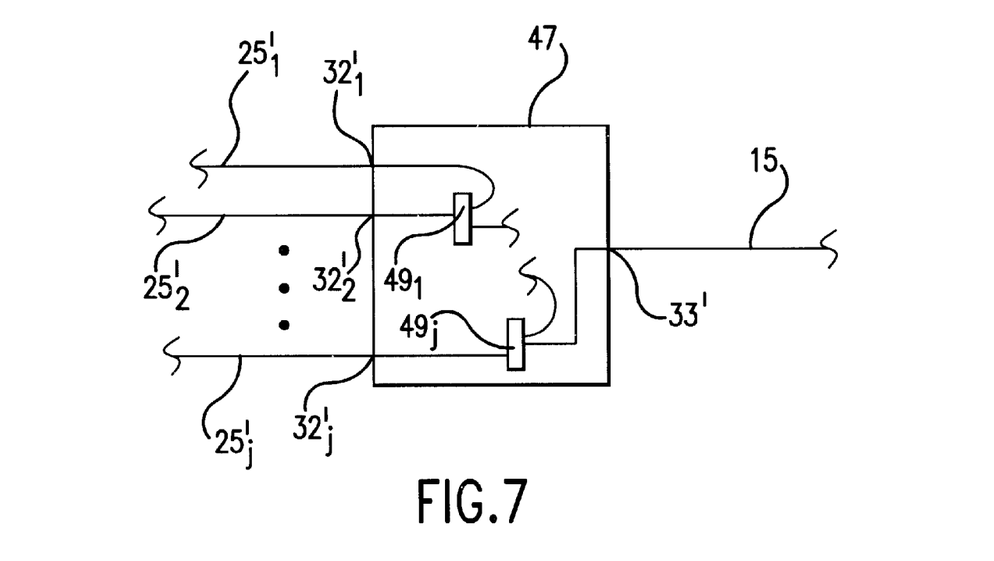
FIG. 7 schematically illustrates an exemplary combiner element illustrated in FIG. 5.

FIG. 7 schematically illustrates an exemplary band-combining element 47 configured to combine the channel bands separated by element 46 and the channels added by way of one or more add/drop modules 40 disposed along one or more transmission paths $25_1' \ldots 25_j'$. Band-combining element 47 can include a plurality of combining elements $49_1 \ldots 49_j$ optically communicating to combine the j channel bands. Combining elements $49_1 \ldots 49_j$ can be, for example, interference filters, however any other optical filtering device which is capable of combining one or more channels within multiple channel bands can be employed. In particular, the band of channels supplied by transmission path $25'_1$ is received at port $32_1'$ and combined, by combining element $49_j$, with the channels received from transmission path $25_2'$ via port $32_2'$. The band of channels transmitted via path $25_j'$ is received at port $33_j'$ and combined, by combining element $49_j$, with the channels received from the other combining elements optically communicating with element $49_j$. The combined channel bands are supplied to transmission path 15 via port 33'.

The separation of a multiplexed optical signal into a plurality of channel bands can be employed with high channel count systems. This can be illustrated by a specific channel configuration example with reference to FIGS. 5–7. The multiplexed optical signal supplied to bandsplitting element 46 can include 72 optical channels to be separated into 9 bands of eight channels each with corresponding guardbands amounting to 24 channels or 3 channels separating each band (except the last channel band where no guardband is needed). In this example bandsplitting element 46 would include eight (i.e. j=8) optically communicating filtering elements $48_1, 48_2 \ldots 48_8$ where the first seven filtering elements ($48_1 \ldots 48_7$) separate the received multiplexed optical signal into 7 bands of eight channels each (56 channels) with the last filtering element (e.g. $48_8$) reflecting a band of 8 channels and transmitting the remaining band of eight channels thereby providing a total of 72 channels. The guardbands associated with 50 GHz spaced channels using the exemplary interference filter configuration contributes to a 96 channel bandwidth. Similarly for this example, band-combining element 47 would include eight combining elements $49_1 \ldots 49_8$ to combine the channel bands.

Figure 8:
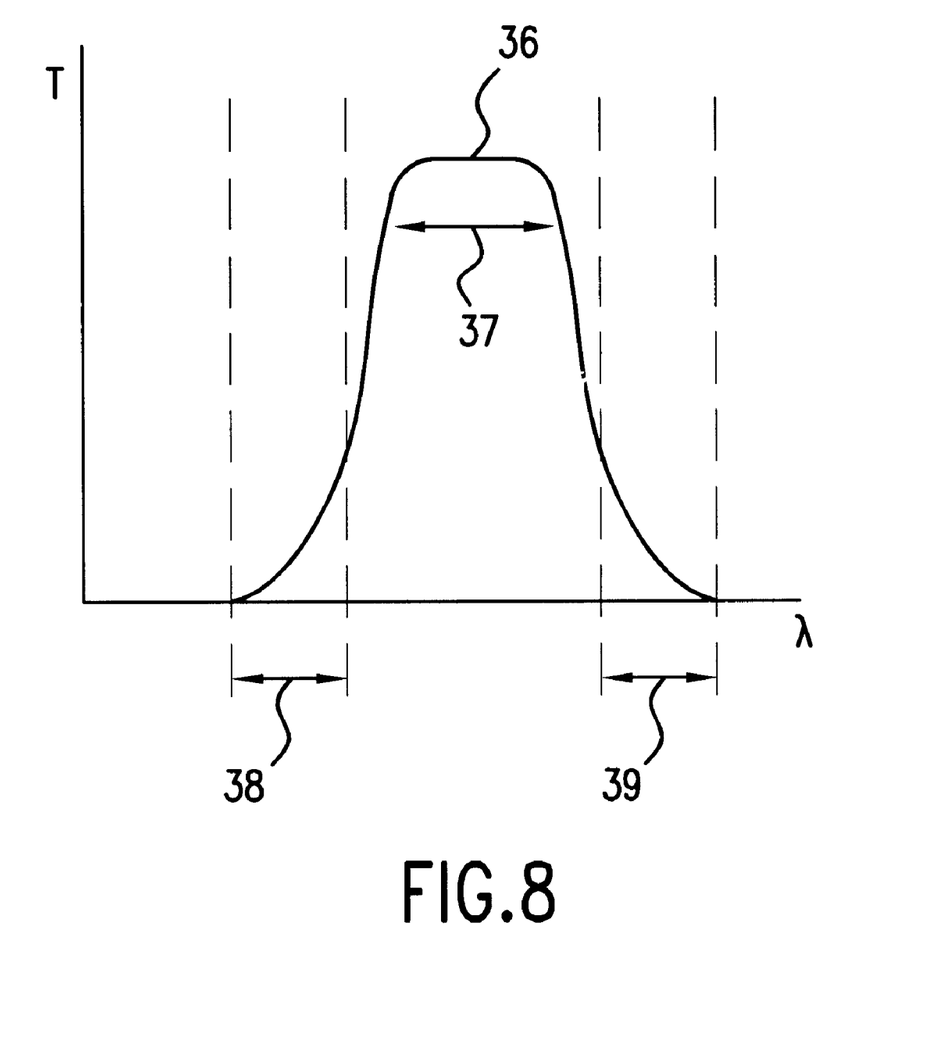
FIG. 8 illustrates a transmission spectrum for an exemplary one of the filtering elements included in the bandsplitter shown in FIG. 6.

FIG. 8 illustrates a transmission spectrum 36 for exemplary filtering element $48_2$ selected from elements $48_1 \ldots 48_j$. The transmission spectrum is associated with a band of 8 channels spaced on a 50 GHz channel grid. Because exemplary filtering element $48_2$ is associated with an intermediate channel band (i.e. optically communicates with filtering elements $48_1$ and $48_3$), two guardbands 38, 39 are present. The optical channels which fall within band region 37 are transmitted through filtering element $48_2$. Optical channels which fall outside of transmission spectrum 36 have a low transmissivity characteristic and are reflected by filtering element $48_2$. A first guardband 38 is associated with the low side of spectrum 36 and a second guardband 39 is associated with the high side of spectrum 36. As noted above, each of these guardbands may be approximately 1.2 nm wide which corresponds to approximately 3 channels in a 50 GHz spaced channel grid.

It should be understood that the number of channel bands as well as the number of channels within a channel band can be changed and that the above channel partitioning is provided for exemplary purposes. In addition, the number of channels within each channel band received by band-combining element 47 may also be dependent on the number of channels added/dropped by one or more add/drop modules 40 disposed along transmission paths $25_1' \ldots 25_j'$ within device 10.

Additionally, optical amplifiers, for example erbium doped fiber amplifiers (EDFA), can also be positioned in one or more of the transmission paths $25_1' \ldots 25_j'$. For example, if the channels supplied to transmission path $25_1'$ include wavelengths which correspond to wavelengths in the 1525 to 1565 nm range, an optical amplifier configured to amplify these wavelengths can be positioned within the transmission path. Similarly, if the channels supplied to transmission path $25_2'$ include wavelengths in the 1570 to 1600 nm range, an optical amplifier configured to amplify these wavelengths can be positioned along transmission path $25_2'$. When an add/drop module (e.g. module 40) is included along one or more of the transmission paths $25_1' \ldots 25_j'$, the amplifiers can be positioned before and/or after each add/drop module.

Figure 9:
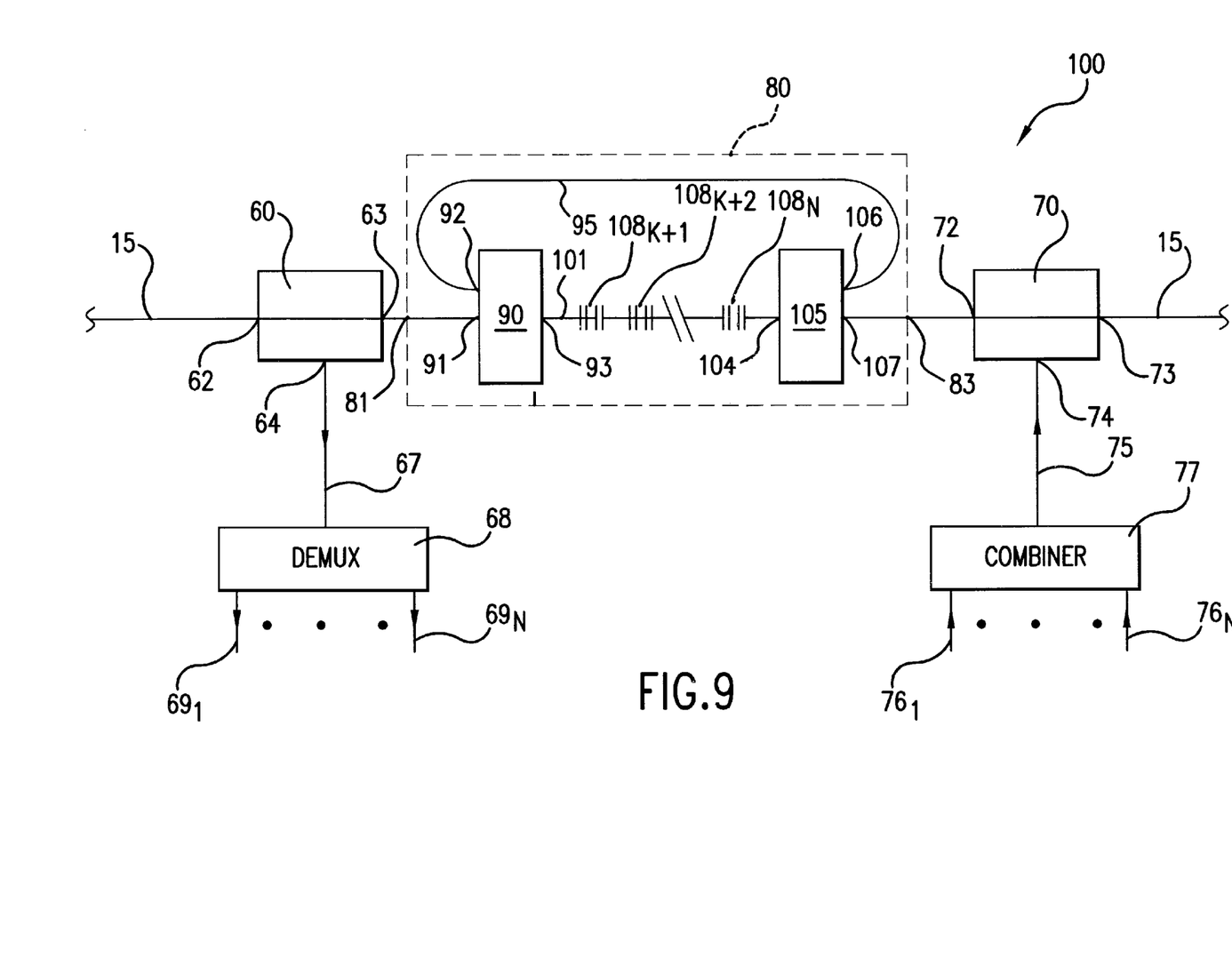
FIG. 9 schematically illustrates an alternative embodiment of an optical device in accordance with the present invention.

FIG. 9 illustrates an alternative embodiment in accordance with the present invention wherein an optical device 100 comprises a first optical transfer element 60, an optical transmission-band element 80 and a second optical transfer element 70. Transmission path 15 optically communicates with port 62 of first transfer element 60. Transmission path 15 supplies a multiplexed optical signal having a plurality of optical channels, each at a respective wavelength $\lambda_1 \ldots \lambda_N$ to transfer element 60. Optical transfer element 60 can be, for example, an optical coupler, circulator, splitter or other optical device configured to direct the multiplexed optical signal to ports 63 and 64 of transfer element 60. In this manner, the multiplexed optical signal having wavelengths $\lambda_1 \ldots \lambda_N$ is essentially split, whereby the channels within the multiplexed signal are directed to two different ports of transfer element 60.

Optical path 67 optically communicates with demultiplexer 68 for separating the optical channels into individual optical channels to be routed to separate output paths $69_1 \ldots 69_N$ corresponding to channels to be dropped from the multiplexed optical signal. In particular, a portion of the multiplexed optical signal is supplied to demultiplexer 68 via port 64 of transfer element 60 and transmission path 67 where the signal is demultiplexed into its individual channels. Optical demultiplexer 68 can be selected from any optical device or system capable of receiving a combined optical signal and separating individual optical channels therefrom. Exemplary optical demultiplexers include planar waveguide devices such as arrayed waveguide gratings (AWG) or other routers, as well as passive optical splitters combined with gratings-based selectors, for example the demultiplexer described in U.S. Pat. No. 5,504,609, incorporated herein by reference. Typically, the one or more dropped channels will be routed to an optical receiving device (not shown).

Optical transmission-band element 80 optically communicates with transfer element 60 via port 81. A first bandsplitting element 90 receives the optical channels having wavelengths $\lambda_1 \ldots \lambda_N$ included in the multiplexed signal via port 91. Bandsplitting element 90 can include, for example, a three port interference filter configured to reflect a first portion of the multiplexed optical signal and transmit a second portion of the multiplexed signal effectively forming two separate channel bands similar to bandsplitting element 20 of FIG. 2. Transmission path 95 is coupled to port 92 of bandsplitting element 90. A first band of channels within the multiplexed signal having, for example wavelengths $\lambda_1 \ldots \lambda_K$, is reflected by bandsplitting element 90 and supplied to port 106 of a band-combining element 105 via transmission path 95. If the multiplexed optical signal includes eighty optical channels, for example, path 95 may carry channels having wavelengths $\lambda_1 \ldots \lambda_{40}$.

Transmission path 101 receives the second channel band having wavelengths, for example, $\lambda_{K+1} \ldots \lambda_N$ outputted by bandsplitting element 90 via port 93. Positioned within transmission path 101 can be one or more optical filtering elements $108_{K+1} \ldots 108_N$. Exemplary filtering elements $108_{K+1} \ldots 108_N$ can be Bragg gratings, similar to gratings $18_{K+1} \ldots 18_N$ described above with reference to FIG. 2. Filtering elements $108_{K+1} \ldots 108_N$ can be configured to have a wavelength band of low transmissivity corresponding to the one or more channels having wavelengths $\lambda_{K+1} \ldots \lambda_N$ to be added via transmission path 75 and second optical transfer element 70. The optical channels within the second band not suppressed are supplied to port 104 of band-combining element 105. These transmitted channels are referred to as "through" channels. In this manner, the channels included in the through channels which correspond to the channels to be added via combiner 77, are filtered out such that interference between these channels is avoided.

Band-combining element 105 receives the through channels from transmission path 101 via port 104 as well as the first band of channels at port 106 via transmission path 95. Band-combining element 105 can include, for example, a three port interference filter configured to combine a plurality of optical channels similar to band-combining element 30 shown in FIG. 2. The combined optical channels are supplied to port 72 of second transfer element 70 via port 83 of transmission-band element 80. Generally, the optical signals outputted by ports 92 and 93 of element 90 and port 107 of element 105 each can be down approximately 20 dB so that bandsplitting filter 90 and band-combining element 105 together provide approximately −40 dB of coherent crosstalk.

Optical channels to be added to the multiplexed signal enter second transfer element 70 via port 74 and transmission path 75. Optical combiner 77 receives the channels to be added to the multiplexed signal from paths $76_1 \ldots 76_N$. Second transfer element 70 combines the channels to be added via port 74 with the through channels and channels within the first channel band received via port 72 and outputs the channels to path 15 via port 73. In this manner, channels contained in the signal outputted via port 93 which correspond to the channels be added by way of combiner 77 are prevented from entering combining element 105 by filtering elements $108_{K+1} \ldots 108_N$, thereby avoiding crosstalk problems.

Additionally, optical amplifiers (not shown) configured to amplify optical channels within respective wavelength bands can be positioned along transmission paths 101 and/or 95. For example, if the channels supplied to transmission path 95 include wavelengths in the 1525 to 1565 nm range, an optical amplifier configured to amplify these wavelengths can be positioned within transmission path 95. Similarly, if the channels supplied to transmission path 101 include wavelengths in the 1570 to 1600 nm range, an optical amplifier configured to amplify these wavelengths can be positioned within transmission path 101. The amplifier within transmission path 101 can be positioned before or after the series of gratings $108_i \ldots 108_j$ or between the gratings to accommodate the desired configuration.

Figure 10:
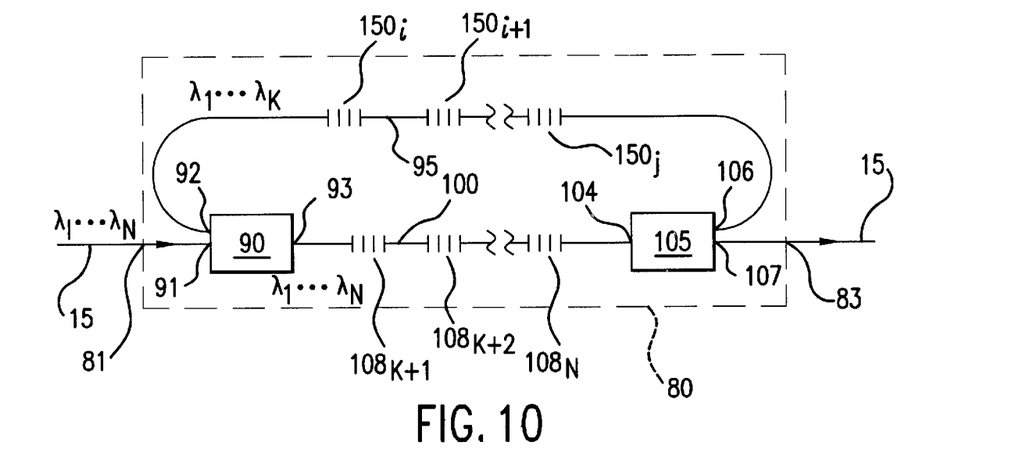
FIG. 10 is a schematic illustration of an alternative embodiment of an optical bandsplitting element depicted in FIG. 9 in accordance with the present invention.

FIG. 10 illustrates an alternative embodiment of transmission-band element 80 in which one or more filtering elements $150_i, 150_{i+1} \ldots 150_j$ are positioned within transmission path 95. Similar to filtering elements $108_{K+1} \ldots 108_N$, exemplary filtering elements $150_i, 150_{i+1} \ldots 150_j$ can be Bragg gratings, each grating having a wavelength band of low transmissivity corresponding to the one or more channels having wavelengths $\lambda_1 \ldots \lambda_k$ within the first band of wavelengths reflected by bandsplitting element 90. The gratings $150_i, 150_{i+1} \ldots 150_j$ correspond to one or more channels to be added via combiner 77. In this manner, additional channels within the first wavelength band can be added without causing crosstalk problems with corresponding channels.

Figure 11:
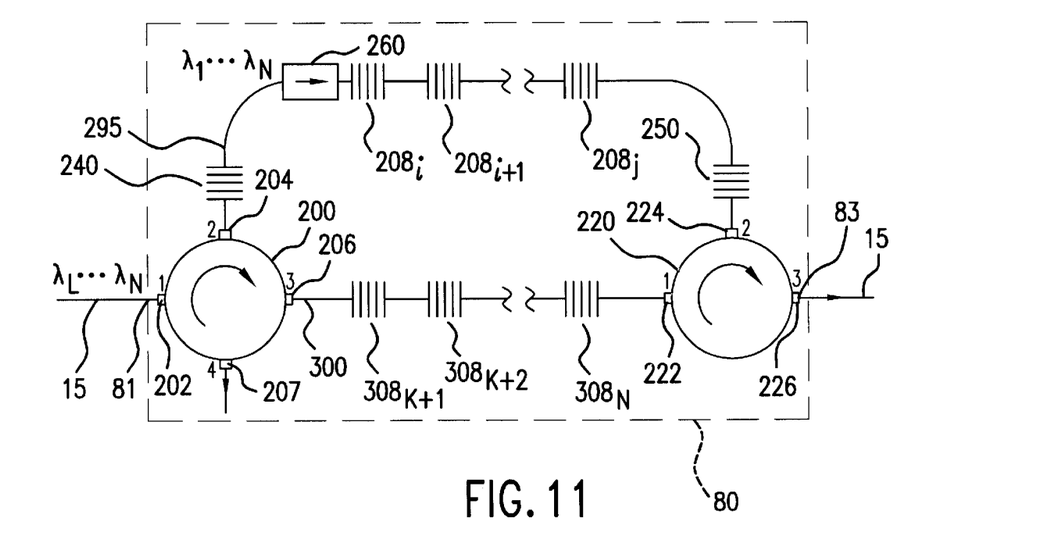
FIG. 11 is a schematic illustration of an alternative embodiment of an optical bandsplitting element depicted in FIG. 9 in accordance with the present invention.

FIG. 11 is an alternative embodiment of transmission-band element 80 in which a first and second optical circulators 200 and 220 are employed. First optical circulator 200 includes a first circulator port 202, second circulator port 204, third circulator port 206 and fourth port 207. Second circulator 220 includes a first circulator port 222, second circulator port 224 and third circulator port 226. Transmission path 15 optically communicates with first circulator port 202 and carries a wavelength division multiplexed optical communication signal having a plurality of optical channels each at a respective wavelength $\lambda_1 \ldots \lambda_N$ via port 81 of transmission-band element 80. Optical communication path 295 optically communicates with second port 204 of the first optical circulator 200 and the second port 224 of second optical circulator 220. Optical communication path 300 communicates with third port 206 of first optical circulator 200 and first port 222 of second optical circulator 220. Third port 226 of second optical circulator 220 optically communicates with transmission path 15.

Positioned in second transmission path 295 are a first and second broadband filtering elements 240 and 250. The multiplexed optical signal propagates along transmission path 15 and enters first optical circulator port 202. The signal exits circulator 200 at second port 204 and is carried along transmission path 295 to first broadband filter 240. Filters 240 and 250 can be, for example, fiber gratings configured to reflect a first band of channels corresponding to, for example, shorter wavelengths within the multiplexed optical signal and transmit a second band of channels corresponding to, for example, longer wavelengths within the multiplexed optical signal. In addition, filtering elements 240 and 250 may each include one or more fiber gratings configured to reflect one or more optical channels. Radiation mode loss experienced from broadband gratings 240 and 250 is out of band and therefore does not affect the channels within the channel bands. The channels reflected by grating 240 reenter circulator 200 via port 204 and exit the circulator at port 206 onto transmission path 300.

The channels which pass through grating 240 continue along transmission path 295 and pass through optical isolator 260 to filtering elements $208_i$, $208_{i+1}$ ... $208_j$. As in the previous embodiments, one or more filtering elements $208_i$, $208_{i+1}$ ... $208_j$, such as Bragg gratings, include a wavelength band of low transmissivity corresponding to one or more channels having wavelengths $\lambda_L$ ... $\lambda_N$ to be added to the multiplexed signal. The channels suppressed by filtering elements $208_i$, $208_{i+1}$ ... $208_j$ propagate back toward isolator 260. The channels not suppressed by filtering elements $208_i$, $208_{i+1}$ ... $208_j$, the first set of pass-through channels, continue through broadband filter 250 and enter port 224 of second circulator 220.

Similarly, transmission path 300 has positioned therein, one or more optical filtering elements $308_{K+1}$ ... $308_N$, similar to gratings $108_{K+1}$ ... $108_N$, such as Bragg gratings, each grating having a wavelength band of low transmissivity corresponding to one or more channels having wavelengths $\lambda_1$ ... $\lambda_k$ to be added to the multiplexed signal. The optical channels having these wavelengths are reflected back toward circulator port 206 and exit circulator 200 at port 207. The channels not reflected by filtering elements $308_{K+1}$ ... $308_N$, the second set of pass-through channels, continue along transmission path 300 and enter port 222 of second circulator 220. The second set of pass-through channels exit circulator 220 at port 224 and are reflected back toward port 224 by broadband filter 250. The first set of pass-through channels are combined with the second set of pass-through channels at circulator 220 and both sets of channels exit circulator port 226 onto transmission path 15. In this manner, optical circulators in combination with broadband fiber gratings can be used as bandsplitting elements to separate a multiplexed optical signal.

Figure 12:
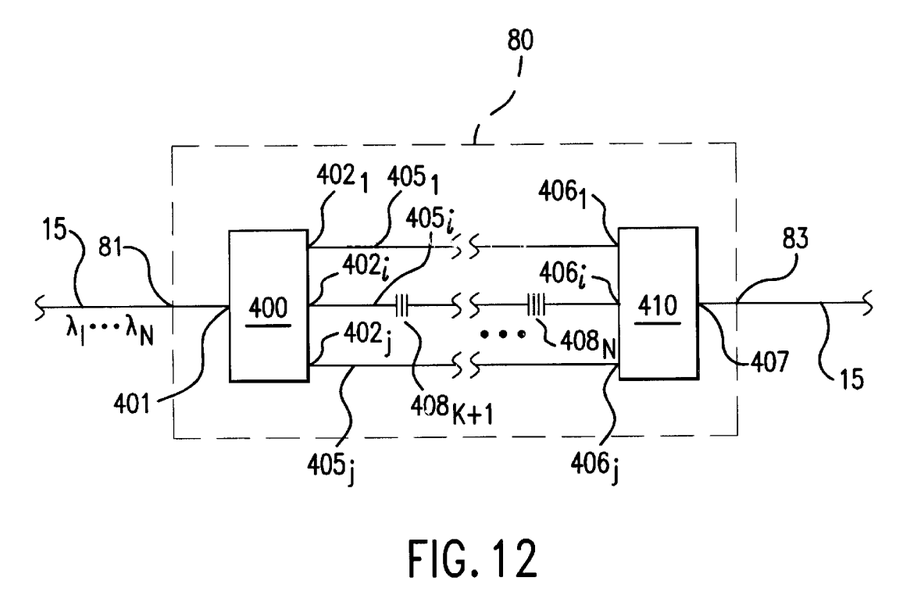
FIG. 12 is a schematic illustration of an alternative embodiment of an optical bandsplitting element depicted in FIG. 9 in accordance with the present invention.

FIG. 12 illustrates an alternative embodiment of transmission-band element 80 in accordance with the present invention wherein a bandsplitting element 400 and band-combining element 410 are employed. Bandsplitting element 400 receives a multiplexed optical signal having a plurality of channels each at a respective wavelength $\lambda_1$ ... $\lambda_N$ via port 401. Bandsplitting element 400 can include, for example, interference filters which optically communicate to split the multiplexed optical signal into j channel bands having one or more channel in each band similar to that described with reference to bandsplitting element 46 shown in FIGS. 5 and 6. However, any other optical device which is capable of separating a multiplexed optical signal into a plurality of separate channel bands can be employed. Multiple channel bands are separated by element 400 and supplied to transmission paths $405_1$ ... $405_j$ via ports $402_1$ ... $402_j$, respectively. As described above, when interference filters are employed with respect to bandsplitting element 400, a guardband is present between the channel bands.

Positioned within one or more of the transmission paths $405_1$ ... $405_j$, for example transmission path $405_i$, are one or more optical filtering elements $408_{k+1}$ ... $408_N$. Exemplary filtering elements $408_{k+1}$ ... $408_N$ can be Bragg gratings, similar to the gratings described above, configured to reflect one or more channels corresponding to the channels to be added via combiner 77 to avoid crosstalk between the channels. Combining element 410 receives the separated channel bands via transmission paths $405_1$ ... $405_j$ and ports $406_1$ ... $406_j$, respectively and outputs the combined optical channels onto path 15 through port 407. Additionally, optical amplifiers may also be positioned along transmission paths $405_1$ ... $405_j$ as described with reference to FIG. 8. Accordingly, a multiplexed optical signal may be separated into a plurality of channel bands. Moreover, one or more gratings positioned within one or more transmission paths $405_1$ ... $405_j$ can be used to filter-out channels to be added to one or more of the channel bands which comprise the multiplexed optical signal to avoid crosstalk problems. This allows for flexible adding/dropping from channel bands separated by bandsplitting element 400.

While the foregoing invention has been described in terms of the embodiments discussed above, numerous variations are possible. For example, circulators may be used instead of couplers and bandsplitting filters can be used for reflection as well as transmission. Accordingly, modifications and changes such as those suggested above, but not limited thereto, are considered to be within the scope of the following claims.

What is claimed is:

1. An optical device for use in a wavelength division multiplexed optical communication system comprising:

an optical bandsplitter having a first, second and third ports, said first port configured to receive said wavelength division multiplexed optical signal having a plurality of optical channels each at a respective wavelength, said bandsplitter configured to separate said plurality of optical channels into a first group of one or more of said channels and a second group of one or more of said channels, said bandsplitter outputting said first group of channels at said second port and said second group of channels at said third port;

a first transmission path optically communicating with said second port of said bandsplitter, said first transmission path carrying said first group of optical channels, said first transmission path having positioned therein one or more filtering elements configured to filter a first set of one or more channels within said first group of channels, said first set of channels corresponding to one or more optical channels to be added to said multiplexed optical signal, said filtering elements configured to transmit through channels corresponding to channels within said first group of channels outside of said first set of optical channels;

a second transmission path optically communicating with said bandsplitter, said second transmission path carrying said optical channels associated with said second group of channels; and an optical combiner having a first, second and third ports, said first port optically communicating with said first transmission path, said second port optically communicating with said second transmission path, said combiner configured to supply said through channels and said second group of channels to said third port.

2. The optical device in accordance with claim 1 wherein said one or more filtering elements is a first group of filtering elements, said optical device further comprising a second group of one or more filtering elements positioned along said second transmission path, said second group of one or more filtering elements configured to filter out a second set of one or more channels from said second group of channels.

3. The optical device in accordance with claim 2 wherein said second group of one or more filtering elements comprise a Bragg grating.

4. The optical device in accordance with claim 1 further comprising an optical transfer element having a first, second and third ports, said first port configured to receive said multiplexed optical signal, said second and third ports outputting said multiplexed optical signal, said third port optically communicating with said bandsplitter.

5. The optical device in accordance with claim 3 further comprising an optical demultiplexer optically communicating with said second port of said optical transfer element, said demultiplexer configured to separate said multiplexed optical signal into one or more channels to be dropped from said multiplexed optical signal.

6. The optical device in accordance with claim 4 wherein said optical transfer element is an optical circulator.

7. The optical device in accordance with claim 4 wherein said optical transfer element is an optical coupler.

8. The optical device in accordance with claim 1 further comprising an optical transfer element having a first second and third ports, said first port optically communicating with said third port of said combiner and configured to receive said through channels and said channels within said second group of channels, said second port of said optical transfer element configured to receive said one or more channels to be added to said through channels, said third port of said optical transfer element outputting said one or more channels to be added, said through channels and said second group of channels.

9. The optical device in accordance with claim 8 wherein said combiner is a first combiner, said optical device further comprising a second combiner optically communicating with said second port of said optical transfer element, said second combiner configured to receive said one or more channels to be added and supplying said channels to be added to said optical transfer element.

10. The optical device in accordance with claim 8 wherein said optical transfer element is an optical circulator.

11. The optical device in accordance with claim 8 wherein said optical transfer element is an optical coupler.

12. The optical device in accordance with claim 1 wherein said one or more filtering elements comprise a Bragg grating.

13. The optical device in accordance with claim 1 further comprising an optical amplifier optically communicating with said bandsplitter, said amplifier configured to amplify one or more channels associated with said multiplexed optical signal.

14. The optical device in accordance with claim 1 further comprising an optical amplifier disposed along said first transmission path, said amplifier configured to amplify said optical channels associated with said first channel group.

15. The optical device in accordance with claim 1 further comprising an optical amplifier disposed along said second transmission path, said amplifier configured to amplify said optical channels associated with said second channel group.

16. The optical device in accordance with claim 1 further comprising an optical amplifier optically communicating with said combiner, said amplifier configured to amplify one or more channels associated with said through channels.

17. The optical device in accordance with claim 1 wherein said bandsplitter is an interference filter.

18. The optical device in accordance with claim 1 wherein said combiner is an interference filter.

19. The optical device in accordance with claim 1 wherein said bandsplitter is configured to separate said wavelength division multiplexed optical signal into j separate channel bands, where j is an integer, said combiner configured to combine channels within said j channel bands.

20. The optical device in accordance with claim 1 wherein said optical bandsplitter comprises an optical circulator having at least a first, second, and third ports, said first port receiving said wavelength division multiplexed optical signal, said second port of said circulator optically communicating with said second transmission path and configured to output said multiplexed optical signal and receive, as an input, optical channels associated with said first channel group, said third port of said optical circulator optically communicating with said first transmission path, said third port configured to supply said second channel group.

21. The optical device in accordance with claim 20 further including a broadband filtering element positioned along said second transmission path, said broadband filtering element configured to reflect wavelengths corresponding to channels associated with said first channel group toward said second port of said optical circulator and transmit wavelengths corresponding to channels associated with said second channel group.

22. The optical device in accordance with claim 21 wherein said optical circulator is a first optical circulator, said combiner further comprising a second optical circulator having at least a first, second and third ports, said first port optically communicating with said first transmission path and receiving, as an input, said through channels, said second port optically communicating with said second transmission path, said second port configured to receive said second channel group.

23. The optical device in accordance with claim 22 wherein said broadband filtering element is a first broadband filtering element, said optical device further comprising a second broadband filtering element positioned along said second transmission path and optically communicating with said second port of said second optical circulator, said second broadband filtering element configured to reflect said through channels within said first channel group toward said second port of said second optical circulator, said third port of said second optical circulator configured to output said through channels and said channels associated with said second channel group.

24. The optical device in accordance with claim 23 further comprising a group of one or more filtering elements positioned along said second transmission path, said group of filtering elements configured to reflect a first set of one or more channels within said second channel group toward said second port of said first optical circulator, said group of filtering elements configured to transmit a second set of channels within said second channel group outside of said first set of optical channels toward said second port of said second optical circulator.

25. The optical device in accordance with claim 21 wherein said broadband filtering element is a fiber Bragg grating.

26. The optical device in accordance with claim 23 wherein said second broadband filtering element is a fiber Bragg grating.

27. An optical device for use in a wavelength division multiplexed optical communication system comprising:
an optical bandsplitter having a first port configured to receive a wavelength division multiplexed optical signal having a plurality of optical channels each at a respective wavelength, said bandsplitter configured to separate said plurality of optical channels into a first passband and a second passband, said bandsplitter supplying channels associated with said first passband to a second port and channels associated with said second passband to a third port;

an optical add/drop module having a first port optically communicating with said bandsplitter, said add/drop module capable of adding and dropping a first set of one or more channels included within said first passband and transmitting through channels corresponding to channels within said first passband outside of said first set of one or more channels to a second port; and an optical combiner having a first port optically communicating with said third port of said bandsplitter and a second port optically communicating with said add/drop module, said combiner configured to combine said through channels, said added first set of one or more channels, and said channels within said second passband.

28. The optical device in accordance with claim 27 wherein said bandsplitter comprises one or more optically communicating interference filters.

29. The optical device in accordance with claim 27 wherein said optical combiner comprises one or more optically communicating interference filters.

30. The optical device in accordance with claim 27 wherein said add/drop module comprises one or more Bragg gratings configured to select one or more channels to be dropped from said multiplexed optical signal.

31. An optical add/drop multiplexer comprising:

an input port configured to receive a multiplexed optical signal including a plurality of optical channels having a spacing X, each of said optical channels at a respective wavelength, said add/drop multiplexer having a first loss tilt over said plurality of optical channels;

an output port;

a plurality of Bragg gratings optically communicating with said input and said output ports, said Bragg gratings configured to suppress transmission of a first group of one or more channels within said multiplexed optical signal from said input port and transmit through channels within said multiplexed optical signal to said output port, each of said gratings having a transmissivity characteristic as a function of wavelength having:

a gap region defined by a difference Y between a first wavelength and a second wavelength, N of said optical channels lying within said gap region where $N \approx Y/X$;

a loss region associated with a range of wavelengths shorter than said first wavelength;

a high reflectivity region defined by a difference Z between a third wavelength and a fourth wavelength, Q of said optical channels lying within said high reflectivity region where $Q \approx Z/X$;

said add/drop multiplexer configured to suppress transmission of K optical channels where K>M, and M=N+Q;

said through channels having at least one channel falling within the range of wavelengths associated with said loss region; and said add/drop multiplexer having a second loss tilt over said through channels wherein said second loss tilt is less than said first loss tilt if said through channels pass through said plurality of gratings in sequence.

* * * * *